US005621644A

United States Patent [19]

Carson et al.

[11] Patent Number: 5,621,644

[45] Date of Patent: Apr. 15, 1997

[54] METHOD FOR DETERMINING CAMSHAFT AND CRANKSHAFT TIMING DIAGNOSTICS

[75] Inventors: Robert P. Carson, Oxford; William J. Hynes, Ann Arbor; Edward W. Czarnecki, Washington; Christoph Micha, Farmington Hills; Edwin W. Bacon, Jr., Goodrich, all of Mich.

[73] Assignee: Chrysler Corporation, Auburn Hills, Mich.

[21] Appl. No.: 385,483

[22] Filed: Feb. 8, 1995

[51] Int. Cl.[6] .................... G01M 15/00

[52] U.S. Cl. .................... 364/431.04; 364/431.08; 73/116; 123/414

[58] Field of Search .................... 364/431.03, 431.04, 364/431.08, 431.11; 73/116, 117.2, 117.3; 123/414, 612, 90.15

[56] References Cited

U.S. PATENT DOCUMENTS

| | | | |
|---|---|---|---|
| 4,338,813 | 7/1982 | Hunninghaus et al. | 73/116 |
| 4,357,662 | 11/1982 | Schira et al. | 364/431.03 |
| 4,366,793 | 1/1983 | Coles | 123/436 |
| 4,380,800 | 4/1983 | Wilkinson | 364/431.08 |
| 4,787,355 | 11/1988 | Maeda | 123/414 |
| 4,924,830 | 5/1990 | Abe | 123/414 |
| 4,932,379 | 6/1990 | Tang et al. | 123/436 |
| 5,200,899 | 4/1993 | Ribbens et al. | 364/431.08 |
| 5,233,960 | 8/1993 | Kato | 123/414 |
| 5,239,473 | 8/1993 | Ribbens et al. | 364/431.08 |
| 5,245,968 | 9/1993 | Kolias et al. | 123/414 |
| 5,263,450 | 11/1993 | Hashimoto et al. | 123/414 |
| 5,333,577 | 8/1994 | Shinojima | 123/90.15 |
| 5,463,898 | 11/1995 | Blander et al. | 73/116 |

*Primary Examiner*—Collin W. Park
*Attorney, Agent, or Firm*—Mark P. Calcaterra

[57] ABSTRACT

In an engine, associated control system, and method the engine including at least one camshaft having an angular position at a given point in time, and a crankshaft having an angular position at a given point in time. The method comprising the steps of measuring a first window of time using at least one crankshaft angular position pulse as a reference point in time and measuring a second window of time using at least one camshaft angular position pulse as a reference point in time. The method also ascertains an angular position difference between at least one camshaft and crankshaft equal to the second window of time divided by the first window of time and determines whether a misalignment between the at least one camshaft and the crankshaft exists by comparing the angular position difference between the at least one camshaft and crankshaft to a predetermined value.

12 Claims, 4 Drawing Sheets

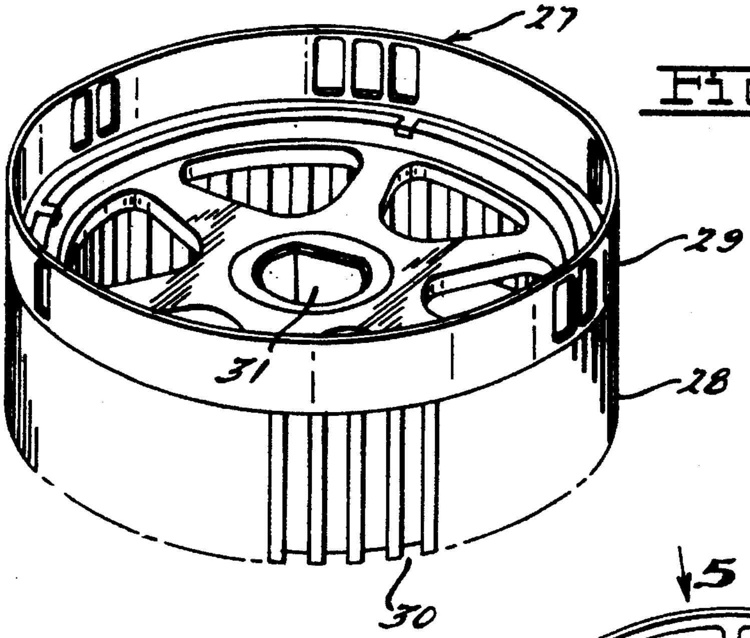
FIG. 3.
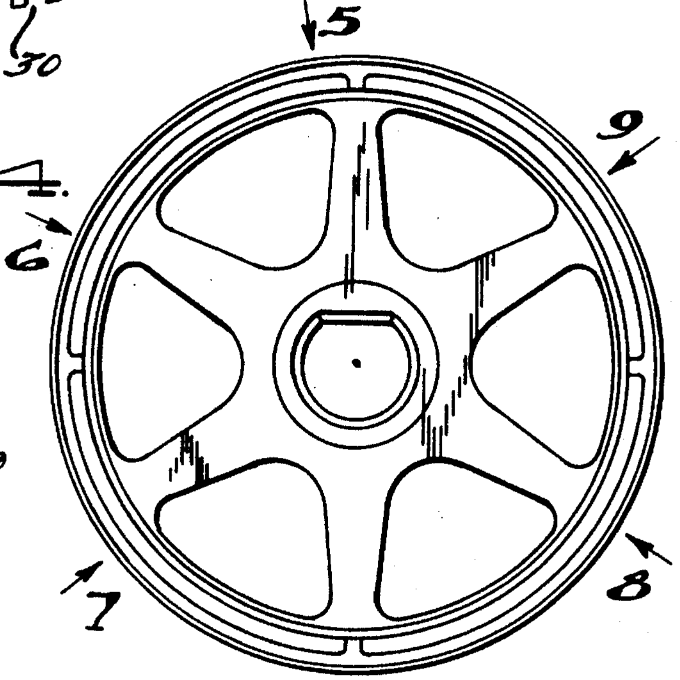
FIG. 4.
FIG. 5.
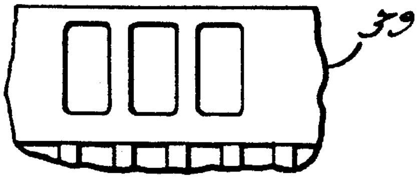
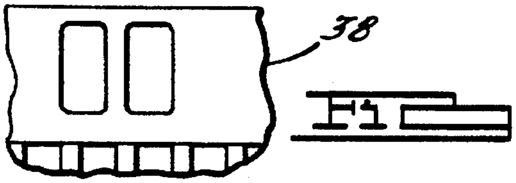
FIG. 6.
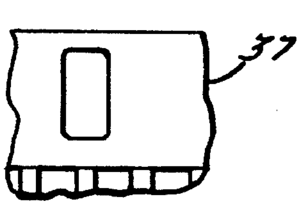
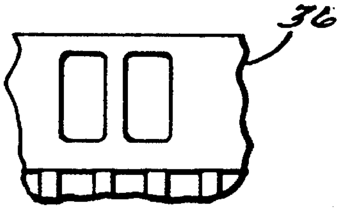
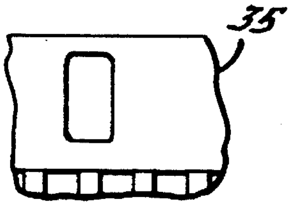
FIG. 7. FIG. 8. FIG. 9.

METHOD FOR DETERMINING CAMSHAFT AND CRANKSHAFT TIMING DIAGNOSTICS

BACKGROUND OF THE INVENTION

1. Field of the Invention

The present invention relates generally to timing diagnostics and, more particularly, to a method of measuring angular degree relationship between the camshaft and crankshaft of an engine.

2. Description of the Related Art

Increasingly stringent hydrocarbon, nitrous oxide, and carbon monoxide emission standards are being placed on the industry through government regulation. Unwanted emissions can be caused when a timing deficiency between the camshaft and crankshaft exists. Currently, to determine whether a deficiency has occurred, service technicians must disassemble the front of the engine to inspect visually, or use a timing tool. A technique using a two-channel oscilloscope is available. But the oscilloscope readings are subject to operator interpretation. Moreover, oscilloscopes are not readily available to all automobile service technicians. Physical inspection of camshaft and crankshaft timing is especially difficult when two camshaft gears exist and is virtually impossible without mechanical disassembly or "degree marking" of the engine.

It is also known in the art that in belt, chain, or gear driven camshaft engine designs, timing belt, timing chain, or gear slippage can occur. Excessive wear or stretching can also cause the timing apparatus to slip. If such slippage does occur, misalignment between the camshaft and crankshaft will result. The cause of timing belt, chain, or gear slippage is commonly the result of low belt, chain, or gear tension. Such slippage can also be attributed to debris entering the timing cover or wear on the timing apparatus due to high engine mileage. Timing belt, chain, or gear slippage may lead to such undesirable conditions as excessive emissions, poor engine performance, bent valves, or an aperture being punched in the cylinder head or piston damage.

It is therefore desirable in the art of vehicles to have a timing diagnostics method which internally determines the camshaft and crankshaft timing relation for easy retrieval by a service technician and further denotes timing apparatus slippage.

SUMMARY OF THE INVENTION

In light of such desirable characteristics, the present invention provides a timing diagnostics method which internally determines the camshaft and crankshaft timing relation for easy retrieval by a service technician.

The present invention relates to an engine, associated control system, and method. The engine includes at least one camshaft having an angular position at a given point in time, a crankshaft having an angular position at a given point in time, and an ECU with corresponding memory and at least one bus line.

In an engine, associated control system, and method the engine including at least one camshaft having an angular position at a given point in time, and a crankshaft having an angular position at a given point in time. The method comprising the steps of measuring a first window of time using at least one crankshaft angular position pulse as a reference point in time and measuring a second window of time using at least one camshaft angular position pulse as a reference point in time. The method also ascertains an angular position difference between at least one camshaft and crankshaft equal to the second window of time divided by the first window of time and determines whether a misalignment between the at least one camshaft and the crankshaft exists by comparing the angular position difference between the at least one camshaft and crankshaft to a predetermined value. The method can determine whether a misalignment between the camshaft and the crankshaft exists by comparing the angular position difference between the camshaft and crankshaft to a predetermined value. If camshaft and crankshaft misalignment has occurred, the method can implement a dosed-loop operation of various engine fuel components.

One advantage of the present invention is that a reduction in service diagnostics will be created as a result of mechanical timing being able to be checked without disassembly of the engine or the need for extra timing diagnostic equipment by polling the information stored in the ECU.

A further advantage is that by continuously calculating the relationship between the camshaft and crankshaft, the engine controller or service technician can calculate the degree of wear on the vehicles timing apparatus and sensor misalignment.

Another advantage of the present invention is that a skipped tooth, chain link, or gear tooth can be detected and stored in the engine timing system. The method can fully operate along any points along the crankshaft and camshaft pulse trains.

By having such information, the ECU can compensate for fuel and spark characteristics, by controlling various fuel components, thereby reducing engine timing variance effects on emissions and power. Moreover, a service technician, by having this information, will be able to diagnose timing belt, chain, or gear wear by polling information already stored in the ECU.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein:

FIG. 3 is a perspective view of a belt driven camshaft sprocket of the present invention;

FIG. 4 is a top plan view of a belt driven camshaft sprocket of the present invention;

FIG. 5 is a side elevational view of a timing notch denoting cylinder four of the present invention;

FIG. 6 is a side elevational view of a timing notch denoting cylinder three of the present invention;

FIG. 7 is a side elevational view of a timing notch denoting cylinder two of the present invention;

FIG. 8 is a side elevational view of a timing notch denoting cylinder six of the present invention;

FIG. 9 is a side elevational view of a timing notch denoting cylinder five of the present invention;

FIG. 10.B is a flow chart diagram illustrating the present methodology executed during a crank pulse;

DESCRIPTION OF THE PREFERRED EMBODIMENT(S)

Vehicles having internal combustion engines, commonly have at least one camshaft with one or more cams attached for opening and closing valves. The camshafts have camshaft sprockets attached to at least one end. In addition, such vehicles also have a crankshaft with one or more crank journals attached thereto for imparting motion to a transmission. Current vehicles may employ the use of camshaft and crankshaft sensors. These sensors generate electrical pulses through the detection of notches or gaps in a gear or metal ring through the use of electromagnetics.

Figure 1:
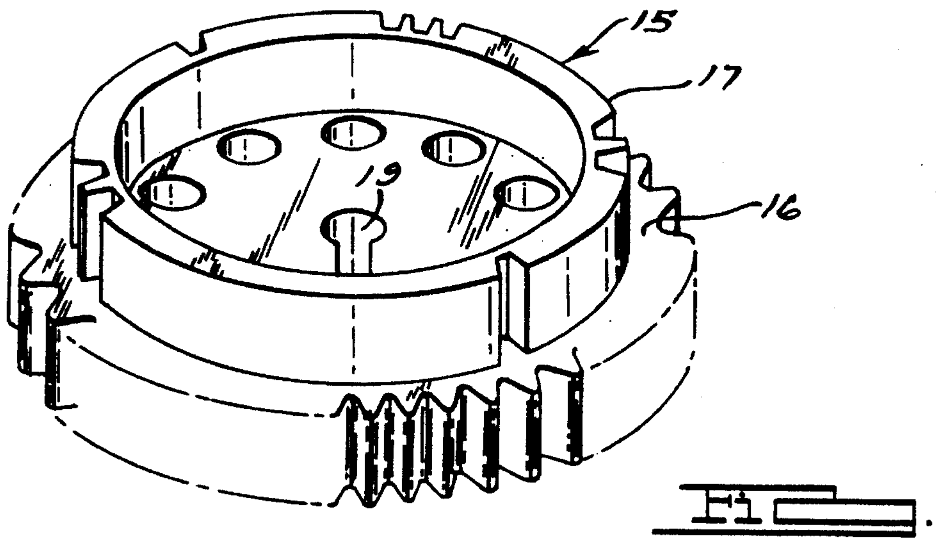
FIG. 1 is a perspective view of a chain driven camshaft sprocket of the present invention.
Figure 2:
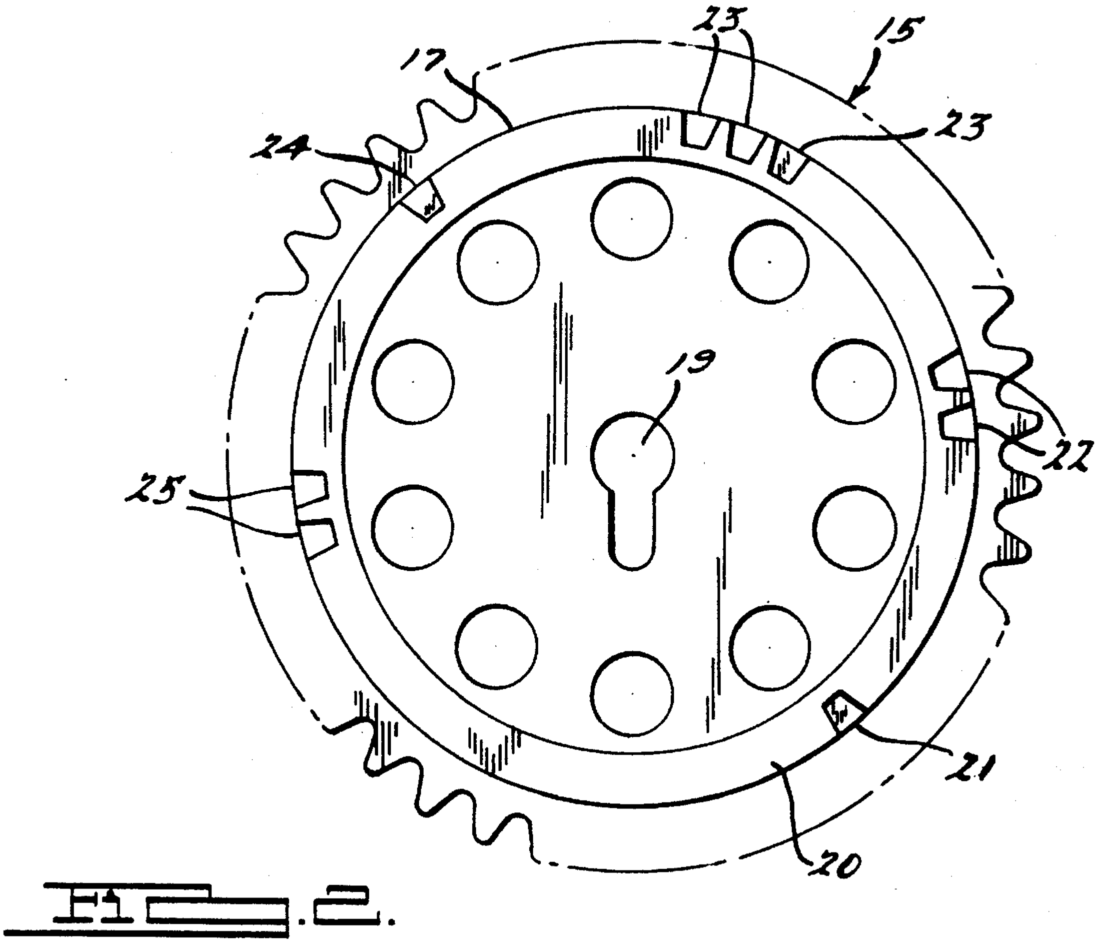
FIG. 2 is a top plan view of a chain driven camshaft sprocket of the present invention.

Referring now to FIG. 1, a camshaft sprocket 15 is shown. The camshaft sprocket 15 has a first circular level 16 which is integrally formed with a second circular level 17. Disposed within the first circular level 16 are a plurality of chain notches 18 for holding a chain link disposed therein. The sprocket 15 also contains a sprocket-to-camshaft connection aperture 19 disposed therein. Referring to FIG. 2, a top view of the camshaft sprocket 15 is shown. Within the second circular level 17, a plurality of cylinder timing notches are formed. The second level 17 has a notch 21 for the second cylinder, a set of notches 22 for the third cylinder, a notch 23 denoting a fourth cylinder, a notch 24 denoting fifth cylinder, and a set of notches 25 for the sixth cylinder. The first cylinder is represented by a first cylinder rim 20 on the second level 17 of the camshaft sprocket 15. It is to be understood, however, that the present invention is also applicable to any number of cylinders depending on the type of engine.

Turning now to FIG. 3, a perspective view of a camshaft sprocket 27 for a belt driven timing system is shown. The sprocket 27 has a first circular disc 28 and a second circular disc 29 integrally formed or assembled together. The first circular disc 28 has a plurality of grooves 30 for frictionally receiving a timing belt. The second disc 29 contains cylinder timing windows. The sprocket 27 further contains a sprocket to camshaft connector aperture 31. FIG. 4 shows a top view of the belt driven camshaft sprocket 27. The second disc 29 has a fifth cylinder window 35 shown in FIG. 9. Windows 36, denoting a sixth cylinder, are shown in FIG. 8 and a second cylinder window 37 is shown in FIG. 7. Third cylinder windows 38 are shown in FIG. 6 and fourth cylinder windows 39 are shown in FIG. 5. The first cylinder is denoted on the second disc 29 of FIG. 3. It is appreciated that the present invention is equally functional on a vehicle with any number of cylinders and is not limited to the present embodiment of six cylinders. A crankshaft sprocket (not shown), having a plurality of timing notches or windows is also employed and is commonly know in the art. In the embodiment shown in FIG. 12 of this invention, four timing notches or windows are used to produce the four angular signal pulses per cylinder. Any number of timing notches or windows could be used with the present method depending on the type of crankshaft sprocket used.

Figure 10A:
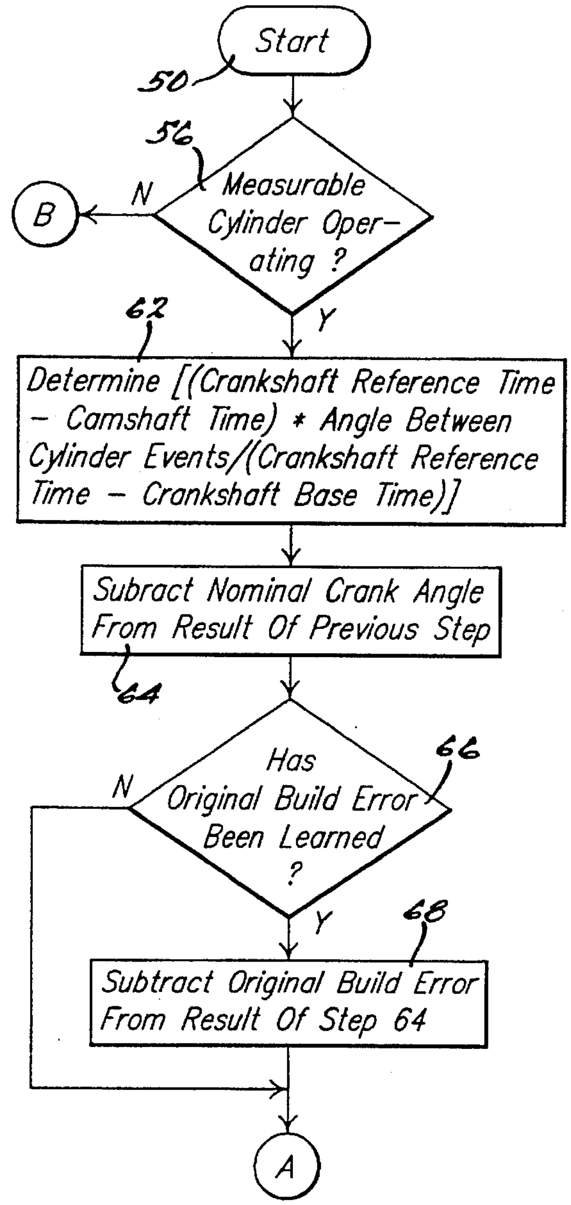
FIG. 10.A is a flow chart diagram illustrating the present methodology executed during a crank pulse.
Figure 10B:
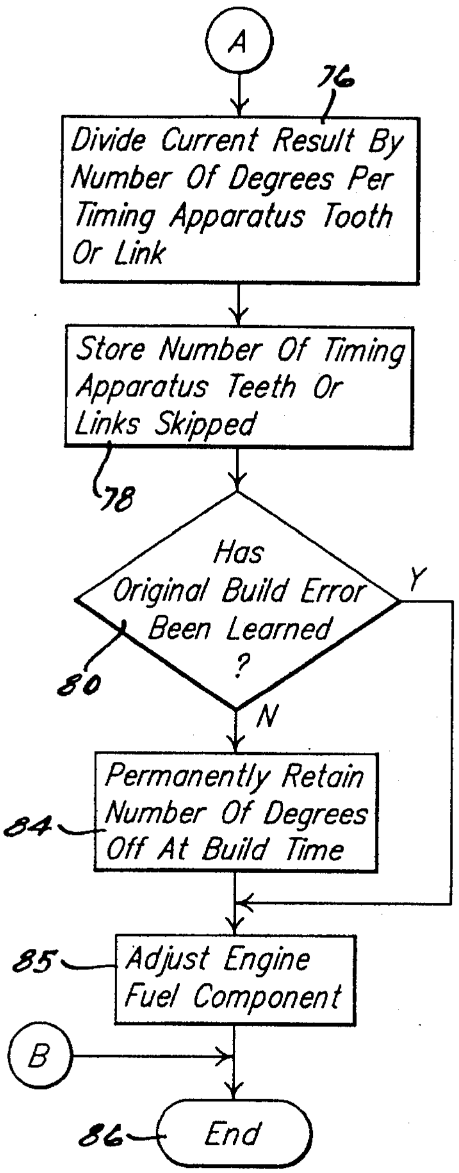

Turning now to FIG. 10.A, a method is disclosed for execution by an Electronic Control Unit (ECU) during a crankshaft pulse. The method begins or starts at bubble 50 upon interrupt or ECU command calling for diagnostics to be performed. The method then falls to decision block 56 where it is determined whether a measurable cylinder is currently functioning. A measurable cylinder is denoted in the present method by the detection of a single angular position pulse generated by the camshaft, denoted as sync pickup in FIG. 12. In the present method cylinders 2 and 5 are designated as the operable cylinders and produce a singular camshaft angular position pulse in accordance with the timing notches or windows of the camshaft sprocket of the timing apparatus. The method could also perform equally well by using any other cylinder as the measurable cylinder and is not limited to the number of camshaft or crankshaft angular position pulses generated per cylinder.

Figure 12:
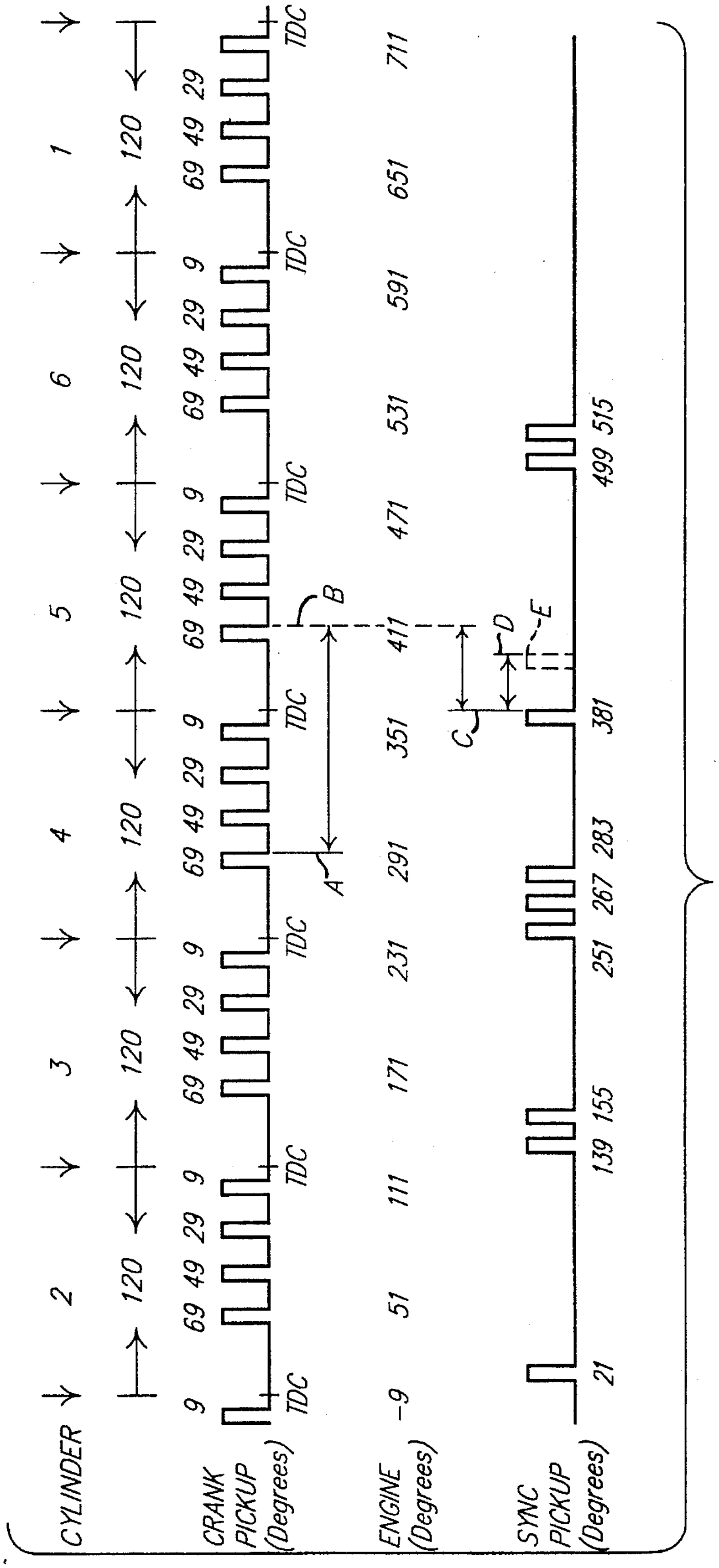
FIG. 12 is a signal wave form timing diagram illustrating various component signals of the present methodology.

If the answer is in the negative in block 56, the method ends at bubble 86. If a measurable cylinder is present, the method falls to block 62. In task block 62 a ratio calculation is made to determine the angular position difference between the camshaft angular signal pulse or pulses occurring during the measurable cylinder event and the angular position pulse B of the crankshaft. This is accomplished by determining a first window of time equal to a camshaft time, captured on the previous camshaft angular position pulse falling edge C as shown in FIG. 12, subtracted from a reference crankshaft time captured on the crankshaft angular position pulse falling edge B. The result is divided by a second window of time equalling the reference crankshaft time, captured at the crankshaft angular position pulse falling edge B, less the base crankshaft time, captured at the crankshaft angular position pulse falling edge A. The result is then multiplied by a fixed angular value to obtain an angular difference between the camshaft angular position pulse C and the crankshaft angular position pulse B.

Signal pulse trains representing the angular positions of the crankshaft and camshaft for a six cylinder engine are shown in FIG. 12. It is to be expressly understood, however, that the present methodology is equally applicable to any number of cylinders that a given engine may ;have. It is also appreciated that the falling edge angular position pulse representations A, B, C, and D shown in FIG. 12 can be based on falling, rising edges, or a combination of both anywhere along the camshaft and crankshaft angular signal pulse trains, and the method will operate the same. In particular, both the A and B crankshaft angular signals can be calculated within one cylinder pulse train. The phantom camshaft angular position pulse E in FIG. 12 represents the optimal or ideal camshaft angular position pulse.

After block 62, the method falls to task block 64. In this block, the nominal crankshaft angular position, equal to the camshaft angular position pulse D less the crankshaft angular position pulse B, is subtracted from the current crankshaft angular position obtained in block 62 which is equal to the angular difference between the camshaft angular position pulse C and the crankshaft angular position pulse B. This difference is stored in memory of the ECU.

The method then falls to decision block 66 shown in FIG. 10.A. In block 66 it is determined whether an initial or original build error between the angular differences of the camshaft and crankshaft has been calculated and stored in ECU memory. If the answer is in the affirmative, the method falls to block 68 where the original build error is subtracted from the result obtained in block 64. The result is obtained by subtracting a difference between the original camshaft angular position and optimal camshaft angular position pulse D from the present camshaft angular position and optimal camshaft angular position pulse D result obtained in block 64. The method then falls to decision block 76. If it is determined, in block 66, that the original build value has not been computed and stored in ECU memory, this indicates an initial start of the engine after manufacture. The method will then advance to decision block 76. In block 76 the number of skipped belt teeth, chain links, or gear teeth is determined and depends on the type of timing apparatus employed in the engine. The method divides the angular difference between the camshaft and crankshaft by the number of crankshaft angle degrees per belt tooth, chain link, or gear tooth. Such a division will result in a real number that can be used to obtain the number of teeth or links skipped. After block 76 the method falls to block 78 whereby the number of teeth or links skipped is stored in ECU memory for subsequent retrieval by a service operator. The method then falls to decision block 80.

In block 80 it is determined whether an initial build error between a falling edge of the camshaft and the designed camshaft position has been calculated and stored. If the answer is in the affirmative, the method falls to block 85 whereby an engine fuel component is adjusted. If, however, the original build value error has not been learned, the method falls to task block 84. In this block the number of angular degrees error between the camshaft and crankshaft at build time is stored in ECU memory. The method then continues to block 85. In this block at least one engine fuel component is adjusted to compensate engine performance degradation resulting from the camshaft and crankshaft misalignment. Such engine fuel components can include, but are not limited to, fuel injectors, spark advance, piston valves, and other fuel related engine parameters that are commonly known in the art to be controlled via an ECU.

Figure 11:
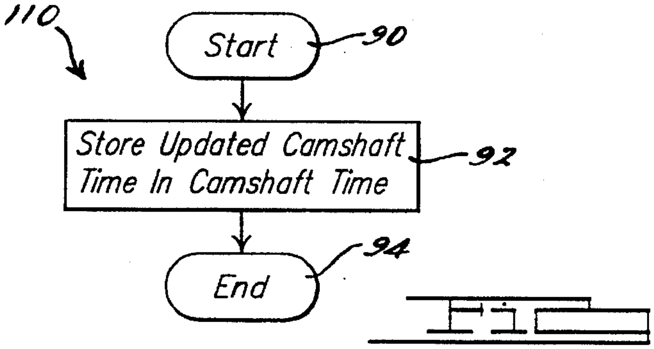
FIG. 11 is a flow chart diagram illustrating the present methodology executed during a cam pulse.

Referring now to FIG. 11 a camshaft interrupt processing system 110 and method is shown. The method begins or starts in bubble 90. The method then falls to block 92. In this block the updated or current time that the camshaft angular position pulse C occurs is stored in the ECU memory register holding the camshaft time value. The method then falls to bubble 94 whereby the method ends.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. In an engine, associated control system, and method, the engine including at least one camshaft having an angular position at a given point in time, and a crankshaft having an angular position at a given point in time, the method comprising the steps of:

producing camshaft angular position pulses, which occur at camshaft times and crankshaft angular position pulses, which occur at crankshaft times, corresponding to angular positions of the camshaft and the crankshaft, respectively;

measuring a first window of time using at least one crankshaft angular position pulse as a reference point in time, the first window of time equal to a reference crankshaft time, less a base crankshaft time;

measuring a second window of time using at least one camshaft angular position pulse as a reference point in time, the second window of time equal to a camshaft time, less a reference crankshaft time, ascertaining an angular position difference between at least one camshaft and crankshaft equal to the second window of time divided by the first window of time;

determining whether a misalignment between the at least one camshaft and the crankshaft exists by comparing the angular position difference between the at least one camshaft and crankshaft to a predetermined value; and controlling operation of a component in the engine if the misalignment between the at least one camshaft and the crankshaft exists.

2. The method of claim 1 further comprising the step of determining whether a timing belt has skipped at least one tooth by dividing the angular position difference between the at least one camshaft and crankshaft by a fixed number of angular degrees equal to a number of angular degrees per timing belt tooth.

3. The method of claim 1 further comprising the step of determining whether a timing chain has skipped at least one link by dividing the angular position difference between the at least one camshaft and crankshaft by a fixed number of angular degrees equal to a number of angular degrees per timing chain link.

4. The method of claim 1 further comprising the step of determining whether a timing gear has skipped at least one tooth by dividing the angular position difference between the at least one camshaft and crankshaft by a fixed number of angular degrees equal to a number of angular degrees per timing gear tooth.

5. In an engine, associated control system, and method, the engine including at least one camshaft having an angular position at a given point in time, a crankshaft having an angular position at a given point in time, and at least one fuel component, the method comprising the steps of:

producing camshaft angular position pulses, which occur at camshaft times and crankshaft angular position pulses, which occur at crankshaft times, corresponding to angular positions of the camshaft and the crankshaft, respectively;

measuring a first window of time equal to a reference crankshaft time less a base crankshaft time, the reference and base crankshaft times occurring at different crankshaft angular position pulses;

measuring a second window of time equal to the reference crankshaft time less a camshaft time occurring at a camshaft angular position pulse;

determining a first angular position difference between the at least one camshaft and crankshaft equal to the second window of time divided by the first window of time multiplied by a fixed angular value;

determining a second angular position difference between the at least one camshaft and crankshaft equal to a camshaft ideal angular position less a crankshaft angular position at the reference crankshaft time;

ascertaining a misalignment angular position difference between the at least one camshaft and crankshaft equal to the first angular position difference less the second angular position difference; and adjusting the at least one fuel component if the misalignment angular position difference between the at least one camshaft and the crankshaft exists.

6. The method of claim 5 further comprising the step of determining whether a timing belt has skipped at least one tooth by dividing the misalignment angular position difference between the at least one camshaft and crankshaft by a fixed number of angular degrees equal to a number of angular degrees per timing belt tooth.

7. The method of claim 5 further comprising the step of determining whether a timing chain has skipped at least one link by dividing the misalignment angular position difference between the at least one camshaft and crankshaft by a fixed number of angular degrees equal to a number of angular degrees per timing chain link.

8. The method of claim 5 further comprising the step of determining whether a timing gear has skipped at least one tooth by dividing the misalignment angular position difference between the at least one camshaft and crankshaft by a fixed number of angular degrees equal to a number of angular degrees per timing gear tooth.

9. In an engine, associated control system, and method, the engine including at least one camshaft having an angular position at a given point in time, a crankshaft having an angular position at a given point in time, at least one fuel component for transferring fuel, and an Electronic Control Unit (ECU) with corresponding memory and at least one bus line, the method comprising the steps of:

determining whether an operable cylinder is operating;

producing camshaft angular position pulses, which occur at camshaft times and crankshaft angular position pulses, which occur at crankshaft times, corresponding to angular positions of the camshaft and the crankshaft, respectively;

measuring a first window of time equal to a reference crankshaft time less a base crankshaft time, the reference and base crankshaft times occurring at different crankshaft angular position pulses;

measuring a second window of time equal to the reference crankshaft time less the camshaft time occurring at a camshaft angular position pulse during the operable cylinder operation;

determining a first angular position difference between the at least one camshaft and crankshaft equal to the second window of time divided by the first window of time multiplied by a fixed angular value;

determining a second angular position difference between the at least one camshaft and crankshaft equal to a camshaft ideal angular position less the crankshaft angular position at the reference crankshaft time;

ascertaining a misalignment angular position difference between the at least one camshaft and crankshaft equal to the first angular position difference less the second angular position difference;

adjusting the at least one fuel component if the misalignment angular position difference between the at least one camshaft and the crankshaft exists; and storing the angular position difference between the at least one camshaft and the crankshaft, in ECU memory, for subsequent retrieval by a service operator.

10. The method of claim 9 further comprising the step of determining whether a timing belt has skipped at least one tooth by dividing the misalignment angular position difference between the at least one camshaft and crankshaft by a fixed number of angular degrees equal to a number of angular degrees per timing belt tooth.

11. The method of claim 9 further comprising the step of determining whether a timing chain has skipped at least one link by dividing the misalignment angular position difference between the at least one camshaft and crankshaft by a fixed number of angular degrees equal to a number of angular degrees per timing chain link.

12. The method of claim 9 further comprising the step of determining whether a timing gear has skipped at least one tooth by dividing the misalignment angular position difference between the at least one camshaft and crankshaft by a fixed number of angular degrees equal to a number of angular degrees per timing gear tooth.

* * * * *